United States Patent [19]

Moczygemba

[11] 4,134,928

[45] Jan. 16, 1979

[54] TETRABLOCK POLYDIENES

[75] Inventor: George A. Moczygemba, Bartlesville, Okla.

[73] Assignee: Phillips Petroleum Company, Bartlesville, Okla.

[21] Appl. No.: 809,822

[22] Filed: Jun. 24, 1977

[51] Int. Cl.$^2$ ............................................ C08F 297/02
[52] U.S. Cl. .................................. 260/879; 260/878 B
[58] Field of Search ................ 260/879, 880 B, 878 B; 526/337

[56] References Cited

U.S. PATENT DOCUMENTS

| B 575,851 | 10/1976 | Futamura | 260/880 B |
| 3,465,063 | 9/1969 | Hassell | 260/876 |
| 3,607,982 | 9/1971 | Winkler | 260/880 B |

*Primary Examiner*—Paul R. Michl

[57] ABSTRACT

Hydrogenated tetrablock polydienes such as polybutadiene-polyisoprene-polybutadiene-polyisoprene exhibit improved elongation as compared to both of the very similar hydrogenated triblock polydienes polybutadiene-polyisoprene-polybutadiene and polyisoprene-polybutadiene-polyisoprene.

6 Claims, No Drawings

TETRABLOCK POLYDIENES

The present invention relates to novel alkadiene copolymers. More specifically, the present invention relates to block copolymers of alkadienes and their hydrogenated counterparts as well as to a process to make same.

BACKGROUND OF THE INVENTION

Various block copolymers of conjugated alkadienes have been disclosed and investigated in the prior art. Some of these polymers exhibit the desirable properties of the thermoplastic elastomers. These polymers are elastomers with sufficient tensile strength to make them useful in rubber applications without curing or crosslinking. These polymers can, therefore, be processed like thermoplastic materials and used like rubber polymers.

One physical property that is of considerable importance for thermoplastic elastomers is the elongation. Desirably the elongation of an elastomeric polymer should be high.

THE INVENTION

It is thus one object of this invention to provide novel block polyalkadienes.

Another object of this invention is to provide thermoplastic elastomers with high elongation.

A further object of this invention is to provide hydrogenated tetrablock copolymers of conjugated alkadienes.

Yet another object of this invention is to provide a process for making the novel polymers of this invention.

These and other objects, advantages, details, features and embodiments of this invention will become apparent to those skilled in the art from the following description of the invention and the appended claims.

It has been found in accordance with this invention that tetrablock polyalkadienes having the basic structure characterized by the formula $$B - I' - B' - I$$

exhibit higher elongation than both of the most closely related triblock polyalkadienes $B - I - B$ and $I - B - I$; in these formulae B and B' each represent homopolymer blocks of polymerized 1,3-butadiene. The blocks B and B' can exhibit the same or different molecular weights and the same or different proportions of cis-, trans- and 1,2-configuration. I and I', which can be from the same or different monomers, can have the same or different molecular weight and the same or different proportions of cis-, and trans- and 1,2-configuration, and represent homopolymer blocks of polymerized conjugated alkadienes having 5 or 6 carbon atoms per molecule.

In accordance with a first embodiment of this invention, polymers having the formula

as defined above are provided in accordance with this invention.

In accordance with a second embodiment of this invention, the hydrogenated counterparts of the polymers defined above are included in this invention. These hydrogenated copolymers can be characterized by having the structural formula

wherein $B_h$ and $B_h'$ represent a hydrogenated homopolymer block of polymerized 1,3-butadiene, these two hydrogenated polybutadiene blocks having the same or different molecular weight and having the same or different proportions of 1,2-configurations. $I_h$ and $I_h'$, which can be blocks from the same or different monomers and which can have the same or different molecular weight and can have the same or different proportion of 1,2-configuration, represent hydrogenated homopolymer blocks of polymerized conjugated dienes having 5 or 6 carbon atoms per molecule.

Examples of conjugated alkadienes that are polymerized into blocks I and I' which blocks in turn are hydrogenated into blocks $I_h$ and $I_h'$ are isoprene, piperylene and 2,3-dimethyl-1,3-butadiene. The preferred conjugated alkadiene for both embodiments of the polymers of this invention is isoprene.

The following more specific details and embodiments concerning the relative sizes of the individual blocks and the copolymers are given for the unhydrogenated copolymers. These preferred ranges also apply to the hydrogenated copolymers taking, of course, into consideration the effect the hydrogenation has on such values.

The polybutadiene blocks B and B' will generally each constitute from 10 to 40 weight percent of the total polymer. The block I will usually constitute 5 to 30 weight percent of the total polymer and the block I' generally will amount to 20 to 60 weight percent of the total polymer. While any proportion of blocks within these limits is intended to be encompassed by this invention, it is preferred that the total weight of polybutadiene blocks B and B' is 50 percent by weight or less of the total polymer. The total weight percentage of the two blocks B and B' together in the polymer preferably is at least 20 weight percent.

The microstructure of the polymer in its polyalkadiene blocks I' and I as well as the corresponding configuration of the hydrogenated polymer in its hydrogenated polyalkadiene blocks $I_h'$ is not critical. It is, however, presently preferred that the amount of 1,2-configuration in the polymer blocks B and B' (as well as the corresponding configuration in the polymer blocks $B_h$ and $B_h'$) be 30 percent by weight or less of the total polymerized butadiene units in the polymer. Yet more preferably, this content of 1,2-configuration will be less than 10 weight percent based on the polybutadiene block. In case of the blocks I and I', the content of the pendant olefinically unsaturated groups should preferably be 30 weight percent or less of the total polymerized conjugated alkadiene in each of these blocks, too.

The polymers defined in accordance with this invention generally will have a weight average molecular weight in the range of 50,000 to 750,000, and preferably in the range of 75,000 to 500,000.

The hydrogenated polymers defined above will generally contain less than about 10 percent of the original olefinic unsaturation from the unsaturated polymerized monomeric alkadienes. Thus, at least about 90 percent of the original unsaturation of the polymer $B - I' - B' - I$ has been removed in these hydrogenated copolymers. It is preferred that the hydrogenated copolymers of this invention contain less than about 3 percent of the original olefinic unsaturation of the unhydrogenated tetrablock polyalkadiene. The olefinic unsaturation of these polymers is readily determined by methods well known in the art such as halogen addition or spectrometric methods.

In accordance with another embodiment of this invention, there is provided a process for making the tetrablock polyalkadiene as defined above having the formula B — I' — B' — I. In this process a first of four monomer portions is added to a monofunctional polymerization initiator system and polymerized essentially completely to form a first living polymer mixture. Thereafter, the second monomer portion is added to the first living polymer mixture and polymerized essentially completely such as to form a second living polymer mixture. Then, the third monomer portion is added to the second living polymer mixture and polymerizes essentially completely to form a third living polymer mixture. Finally, the fourth monomer portion is added to the third living polymer mixture and polymerized essentially completely such as to form a final living polymer mixture. The four monomer portions are added and polymerized either in the sequence b-i'-b'i or in the sequence i-b'-i'-b. In this nomenclature, b and b' each represent a 1,3-butadiene monomer portion, i and i', which can be the same or different, represent monomer portions of conjugated alkadienes of 5 to 6 carbon atoms. The polymer made is recovered from the final polymerization mixture in accordance with procedures well known in the art.

The polymers of this invention thus are readily prepared by sequential addition of monomers to a polymerization system employing anionic polymerization in solution. Sequential monomer addition as such is well known in the art for the solution polymerization of block copolymers of, e.g., conjugated dienes. Well-known initiator systems, e.g., organomonolithium compounds can be employed.

In the following the conjugated alkadienes of 5-6 carbon atoms are also referred to as alkyl-substituted conjugated dienes.

The preferred initiators for preparation of the polymers of this invention are those organomonolithium compounds corresponding to the formula RLi wherein R is a hydrocarbon radical containing from 1 to 20 carbon atoms. Specific examples of such initiators include methyllithium, ethyllithium, n-butyllithium, sec-butyllithium, n-decyllithium, n-eicosyllithium, phenyllithium, naphthyllithium, p-tolyllithium, cyclohexyllithium, and the like.

The polymerization is normally carried out at temperatures ranging from −50° C. to 150° C., preferably 0° C. to 100° C., in common hydrocarbon diluents such as benzene, toluene, cyclohexane, heptane, isooctane and the like. The above-described initiators are normally employed in amounts ranging from 0.1 to 2 gram milliequivalents of organomonolithium compound per 100 grams of total monomer and preferably from 0.2 to 1.3 gram milliequivalents.

A typical preparation of a tetrablock copolymer B — I' — B' — I involves initiation of polymerization of 1,3-butadiene in solution by use of an organomonolithium compound, such as n-butyllithium. When the polymerization of the butadiene is complete, a charge of a suitable alkyl-substituted conjugated diene such as isoprene is added to the polymerization system containing active polymer-lithium groups (so-called "living" polymer). Following completion of polymerization of the C$_5$ or C$_6$ conjugated diene an additional charge of butadiene is added and polymerized and then an additional charge of alkyl-substituted conjugated diene is added and polymerized. The order of addition of the monomers is not critical except that the butadiene and alkyl-substituted conjugated diene be alternated; thus, an alkyl-substituted conjugated diene charge can be polymerized first, followed by a butadiene charge.

It is well known to one skilled in the art of anionic solution polymerization of conjugated dienes that the microstructure (relative proportions of cis-, trans, and 1,2-configuration) can be varied by the addition of polar compounds, such as tertiary amines or ethers, which serve as structure modifiers and polymerization promoters. Within the scope of this invention such compounds may be employed prior to any one or more of the four monomer charges. The amounts of these polar compounds should preferably be such that the amount of 1,2-configuration in the B and B' polymer blocks is not substantially increased over that obtained when no such polar compound is employed. Thus the B and B' blocks will contain 30 percent by weight or less of the total polymerized butadiene units in the 1,2-configuration and preferably 10 weight percent or less in the 1,2-configuration. The I and I' blocks can contain whatever proportion of pendant olefinically unsaturated groups derived from 1,2-, 2,3-, 3,4-, etc., polymerization is desired. It is preferred that the proportion of pendant olefinically unsaturated groups in the I and I' blocks be 30 weight percent or less of the total polymerized alkyl-substituted conjugated diene in each block. It is within the scope of this invention to include polymers in which the I and I' blocks exhibit the same or different microstructure and also the B and B' blocks exhibit the same or different microstructure, but it is preferred that the B and B' blocks do not differ appreciably in microstructure from each other. The microstructure of the polybutadiene blocks B and B' thus preferably is the same.

Examples of well-known structure modifiers include triethylamine, tetramethylethylenediamine, diethyl ether and tetrahydrofuran.

In accordance with yet a further embodiment of this invention, the hydrogenated counterparts of the polymers described above, which hydrogenated polymers have the formula $B_h$ — $I_h'$ — $B_h'$ — $I_h$ are made by hydrogenating the copolymer by contacting a solution of the unhydrogenated polymer with a hydrogenation catalyst in the presence of free hydrogen and under hydrogenation conditions and isolating the hydrogenated polymer obtained. Preferably, the final polymer mixture containing a living polymer is hydrogenated by contacting the solution with the hydrogenation catalyst. It is, however, also possible to hydrogenate the polymer of the formula B — I' — B' — I after it has been deactivated by methods such as addition of water or lower alcohols to the living polymer.

Hydrogenation of the inventive polymers of B — I' — B' — I is readily accomplished using procedures which are as such well known in the art for the hydrogenation of unsaturated polymers. A wide variety of hydrogenation catalysts can be employed for the hydrogenation of unsaturated polymers. Especially preferred catalysts include nickel on kieselguhr, Raney nickel, copper chromite, molybdenum sulfide and platinum oxide. It is especially preferred to employ the well-known hydrocarbon-soluble catalysts such as a reduced nickel catalyst derived from nickel carboxylates, such as nickel octanoate reduced with an organoaluminum compound such as triethylaluminum.

Conditions of hydrogenation are not critical so long as the desired degree of hydrogenation is achieved. Temperatures generally in the range of 30° to 200° C. and hydrogen pressures generally in the range of 70 to 35,000 kPa are usually sufficient to produce the desired results.

The inventive hydrogenated copolymers possess good resistance to ozone and good weatherability. These polymers are thermoplastic (moldable and re-moldable) in nature and yet possess in the uncured state tensile strength and other properties characteristic of vulcanized rubbers. Hence they are thermoplastic elastomers similar in nature to the well-known linear and radial teleblock copolymers of conjugated dienes and monovinyl aromatics possessing terminal blocks of polymerized monovinyl aromatic compound and an internal block of polymerized conjugated diene, yet they do not possess the aromatic and olefinic unsaturation characteristic of these known copolymers.

The inventive hydrogenated copolymers also possess high elongation, thus providing "give" or flexibility to articles molded therefrom. These polymers are thus useful in a wide variety of applications where molded rubbery articles with good weatherability are needed, such as garden hoses, sealants, and roofing materials.

The invention will be yet more fully understood from the following examples which are intended to illustrate still further preferred embodiments of this invention but not to unduly limit the scope thereof.

EXAMPLE I

The following runs demonstrate the preparation of inventive tetrablock copolymers of structure polybutadiene-polyisoprene-polybutadiene-polyisoprene.

The following recipe was employed for the production of the inventive copolymers

| Ingredient | Amount, parts by Weight |
|---|---|
| Cyclohexane | 779 |
| Tetrahydrofuran | 0.071 |
| n-Butyllithium | Var. |
| Butadiene block B | Var. |
| Isoprene block I' | Var. |
| Butadiene block B' | Var. |
| Isoprene block I | Var. |

Into a glass reactor containing a nitrogen atmosphere were placed cyclohexane, tetrahydrofuran, butadiene for the B block, and n-butyllithium. The reaction mixture was stirred for 30 minutes at 70° C. after which the isoprene for the I' block was added. After 30 minutes of stirring at 70° C. the butadiene for the B' block was added. After further polymerization at 70° C. for 30 minutes, the isoprene for the I block was added and stirring at 70° C. continued for 30 minutes. Ethanol (0.2 ml) was added to inactivate the system and the polymer was recovered by coagulation with isopropanol. Drying of the coagulated polymer was accomplished under reduced pressure at 50° C.

Table I contains polymerization variables and properties of the thus-prepared copolymers (conversion 100%).

TABLE I

| Run No. | NBL[1] meq | B [2] | I' [3] | B' [4] | I [5] | I.V. [6] | $M_w \times 10^{-3}/M_n \times 10^{-3}$ [7] |
|---|---|---|---|---|---|---|---|
| 1 | 1.17 | 30 | 50 | 30 | 10 | 1.43 | 172/127 |
| 2 | 1.17 | 24 | 48 | 24 | 24 | 1.40 | 170/132 |
| 3 | 1.17 | 24 | 64 | 24 | 8 | 1.36 | 172/129 |
| 4 | 1.56 | 30 | 30 | 30 | 30 | 1.00 | 100/75 |
| 5 | 1.56 | 30 | 50 | 30 | 10 | 1.20 | 117/93 |
| 6 | 1.56 | 24 | 48 | 24 | 24 | 1.29 | 153/110 |
| 7 | 1.56 | 24 | 64 | 24 | 8 | 1.08 | 119/90 |

[1] Milliequivalents n-butyllithium.
[2] Butadiene for B block, parts by weight.
[3] Isoprene for I' block, parts by weight.
[4] Butadiene for B' block, parts by weight.
[5] Isoprene for I block, parts by weight.
[6] Inherent viscosity - measured as described in U.S. Pat. 3,278,508, note (a), using tetrahydrofuran as solvent. Polymers were gel-free.
[7] Weight average molecular weight ($M_w$) and number average molecular weight ($M_n$) determined by gel permeation chromatography.

EXAMPLE II

The following runs demonstrate the inventive hydrogenated copolymers prepared by hydrogenation of the polymers described in Example I.

The polymer (50 gm) dissolved in cyclohexane (400 gm) was placed in a ½ gallon glass hydrogenation reactor. A reduced nickel hydrogenation catalyst was prepared as follows: A 6 weight percent solution of nickel octanoate in cyclohexane was treated with a solution of triethylaluminum in cyclohexane in quantities sufficient to give an aluminum/nickel molar ratio of 2.5/1. Sufficient reduced nickel solution to contain 0.5 part by weight nickel per one hundred parts by weight polymer was introduced into the hydrogenation reactor. The initial temperature was regulated to 50° C. With continuous stirring, hydrogen was added at 345 kPa pressure. After an initial temperature surge to about 60° C., the temperature was regulated to 50° C. for the remainder of the 2-hour reaction period. At the completion of the hydrogenation period the reaction solution was treated with water (50 to 100 gm) to deactivate the catalyst after which oxygen was added and mixed at 70° C. until the reaction mixture changed to a light gray or green color. The reaction mixture was washed with a solution of phosphoric acid and ammonium phosphate (¼ weight ratio) and then washed with water. As a stabilizer 0.5 weight percent based on polymer of 2,6-di-t-butyl-4-methylphenol was added. The hydrogenated polymer was isolated by coagulation with isopropanol and dried under reduced pressure at 50° C.

Table II contains the properties of the resultant hydrogenated copolymers.

TABLE II

| Run. | 8 | 9 | 10 | 11 | 12 | 13 |
|---|---|---|---|---|---|---|
| Parent polymer run No. | 1 | 3 | 4 | 5 | 6 | 7 |
| Melt flow[1] | 2.2 | 2.4 | 46 | 21 | 12 | 28 |
| 300% Modulus, psi[2] | 610 | 500 | 520 | 635 | 450 | 510 |
| Tensile, psi[2] | 1880 | 965 | 635 | 1080 | 720 | 800 |
| Elongation, %[2] | 990 | 960 | 670 | 820 | 840 | 670 |
| Tensile at 50° C., psi | 825 | 535 | 375 | 620 | 385 | 390 |
| Elongation at 50° C., % | 710 | 520 | 230 | 470 | 360 | 270 |
| Set at 300% elongation, %[2] | 26 | 43 | 45 | 38 | 23 | 23 |
| Shore A hardness[3] | 80 | 73 | 79 | 80 | 73 | 74 |
| Ozone resistance[4] | | | | | | |
| Aged 1 day | 0/0 | 8/10 | 0/0 | 0/0 | 6/10 | 10/X |
| Aged 5 days | 0/0 | X/X | 0/0 | 0/0 | 10/X | X/X |

[1] Measured at 190° C. and 2.16 kg weight. ASTM D-1238-65T.
[2] ASTM D-412-66.
[3] ASTM D-2240-68.
[4] Sample strips 7.5 or 10 cm long and 1.3 cm wide were bent into a loop and the ends were clamped together. The loops were exposed to air containing 50 ppm ozone for the designated period. The loops were then examined on the surface at the point of greatest stress and rated on a 1 to 10 point system by comparison with a standard set of samples whose values range from 1 = surface slightly dulled to 5 = many minute shallow cracks to 10 = deep and numerous cracks to X = failure. Values in table, e.g., 8/10, refer to rating of 10 and 7.5 cm strips, respectively.

The data in Table II illustrate the properties of inventive hydrogenated polymers. The high green tensile strength and high elongation are indicative of thermoplastic elastomers. The generally good ozone resistance of the inventive polymers illustrates their weatherability. The variation in properties listed in Table II illustrate the wide variety in properties which are available by varying the relative proportions of the blocks within the polymer and also the molecular weight.

EXAMPLE III

The following runs illustrate the preparation of inventive unhydrogenated and hydrogenated polymers and of comparative prior art polymers.

In inventive Runs 14 and 16 and prior art Runs 15 and 17 polymers were prepared as generally described in Example I. Prior art polymers from Runs 15 and 17 were triblock polymers prepared in the same manner as the inventive polymers except that no I block was present in the polymer. The only variation in polymerization conditions between these runs and those of Example I was polymerization time of 50 minutes at 70° C. after each addition of monomers.

The following recipe and Table III contain polymerization parameters. Table III also contains properties of resultant polymers (conversion was complete).

| Ingredient | Amount, Parts by Weight |
| --- | --- |
| Cyclohexane | 312 |
| Tetrahydrofuran | 0 |
| Sec-butyllithium | Var. |
| Butadiene block B | Var. |
| Isoprene block I' | Var. |
| Butadiene block B' | Var. |
| Isoprene block I | Var. |

TABLE III

| Run No. | SBL[1] meq | B | I' | B' | I | I.V. | $M_w \times 10^{-3} / M_n \times 10^{-3}$ |
| --- | --- | --- | --- | --- | --- | --- | --- |
| 14 | 0.66 | 15[2] | 24 | 15 | 6 | 1.30 | 145/105 |
| 15 | 0.66 | 15 | 30 | 15 | 0 | 1.54 | 132/91 |
| 16 | 0.9 | 15 | 24 | 15 | 6 | 0.96 | 82/67 |
| 17 | 0.9 | 15 | 30 | 15 | 0 | 0.94 | 84/68 |

[1]Milliequivalents of sec-butyllithium.
[2]Values for B, I', B' and I are parts by weight Runs 14 to 17 were made in duplicate. The duplicates were combined prior to isolation of the polymer.

The polymers from Runs 14 to 17 were hydrogenated as described generally in Example II. Deviations from the procedure of Example II were: 506 gm cyclohexane was employed; the catalyst contained Al/Ni in 2.8/1 molar ratio; hydrogenation was begun at 30° C.; after a temperature surge to 70° C., the temperature was maintained at 70° C. for a total hydrogenation time of 1 hour.

Table IV contains the properties of the resultant hydrogenated polymers.

TABLE IV

| Run No. | 18 (inv.) | 19 (art) | 20 (inv.) | 21 (art) |
| --- | --- | --- | --- | --- |
| Parent polymer run No. | 14 | 15 | 16 | 17 |
| Unsaturation, %[1] | 1.55 | 1.37 | 1.28 | 2.52 |
| Melt flow[2] | 2.5 | 2.2 | 14.6 | 15.7 |
| 300% Modulus, psi | 720 | 730 | 700 | 775 |
| Tensile, psi | 1520 | 1655 | 920 | 1065 |
| Elongation, % | 820 | 690 | 670 | 590 |
| Set at 300% elongation, % | 60 | 46 | 49 | 42 |
| Shore A hardness | 70 | 71 | 67 | 74 |

[1]Determined by reaction with ICl as described in U.S. Pat. 3,299,016, column 9, lines 57+.
[2]Measured at 190° C. and 5 kg weight.

The data in Table IV show that the inventive hydrogenated polymers possess higher elongation than the comparative prior art polymers.

EXAMPLE IV

The following runs illustrate the preparation of inventive and control unhydrogenated and hydrogenated copolymers. Runs 22 and 23 prepared inventive polymers. Runs 24, 25 and 26 prepared control polymers corresponding to general structure B-I-B, I-B-I and B-I-B-I-B (B is a polybutadiene block and I is a polyisoprene block).

In order to prepare polymers as described above involving a number of increments of monomer, the following procedure was employed in order to minimize polymerization poisons which normally increase with each incremental addition. Monomer and solvent were both charged incrementally. However, before each increment of solvent and monomer was polymerized it was titrated with a colored (reddish-brown) multifunctional organolithium solution (DiLi-3 available from Lithium Corporation) until the color of the titrant was no longer discharged, thus indicating inactivation of the polymerization poisons. The first titrated increment of monomer and solvent was added to an agitated glass reactor containing a nitrogen atmosphere. Polymerization was initiated with 0.646 gram-milliequivalents of sec-butyllithium. After a polymerization period of 1 hour at 70° C. the second titrated increment of solvent and monomer was added and polymerized at 70° C. for 1 hour. Each succeeding titrated increment of monomer and solvent was polymerized at 70° C. for 1 hour. After the desired number of increments of monomer and solvent, the polymers were isolated and dried as described in Example I.

Table V gives the composition of the increments (and hence of the blocks of polymerized monomer) and properties of the resultant polymers. The conversion was complete.

TABLE V

| Run No. | 22 (inv.) | 23 (inv.) | 24 | 25 | 26 |
| --- | --- | --- | --- | --- | --- |
| Structure[1] | B-I-B-I | B-I-B-I | B-I-B | I-B-I | B-I-B-I-B |
| Weight, % | 25-40-25-10 | 25-25-25-25 | 25-50-25 | 20-20-20--20-20 | 20-20-20-20-20 |
| First, increment |  |  |  |  |  |
| Cyclohexane, gm | 117 | 117 | 117 | 117 | 117 |
| 10 Butadiene, gm | 15 | 15 | 15 | 0 | 12 |
| Isoprene, gm | 0 | 0 | 0 | 15 | 0 |
| Second increment |  |  |  |  |  |
| Cyclohexane, gm | 117 | 117 | 117 | 117 | 78 |
| Butadiene, gm | 0 | 0 | 0 | 30 | 0 |
| Isoprene, gm | 24 | 15 | 30 | 0 | 12 |
| Third increment |  |  |  |  |  |
| Cyclohexane, gm | 78 | 78 | 78 | 78 | 78 |
| Butadiene, gm | 15 | 15 | 15 | 0 | 12 |
| Isoprene, gm | 0 | 0 | 0 | 15 | 0 |
| Fourth increment |  |  |  |  |  |

TABLE V-continued

| Run No. | 22 (inv.) | 23 (inv.) | 24 | 25 | 26 |
|---|---|---|---|---|---|
| Cyclohexane, gm | 78 | 78 | 0 | 0 | 78 |
| Isoprene, gm | 6 | 15 | 0 | 0 | 12 |
| Fifth increment | | | | | |
| Cyclohexane, gm | 0 | 0 | 0 | 0 | 39 |
| Butadiene, gm | 0 | 0 | 0 | 0 | 12 |
| Properties | | | | | |
| Inherent viscosity | 1.14 | 1.10 | 1.10 | 1.04 | 1.22 |
| $M_w \times 10^{-3}/M_n \times 10^{-3}$ | 122/99 | 121/95 | 122/100 | 117/105 | 131/101 |

[1] B:Polybutadiene block I:Polyisoprene block

The inventive and control polymers of Runs 22 to 26 were hydrogenated and recovered according to the procedure of Example II. In Table VI are tabulated the properties of the resultant hydrogenated polymers.

TABLE VI

| Run No. | 22 (inv.) | 23 (inv.) | 24 | 25 | 26 |
|---|---|---|---|---|---|
| Tensile, psi | 1120 | 880 | 1280 | 500 | 1540 |
| Elongation, % | 750 | 800 | 690 | 630 | 720 |

The data in Tables V and VI illustrate the inventive hydrogenated tetra-block copolymers having higher elongation than comparable hydrogenated triblock or pentablock copolymers.

Reasonable variations and modifications which will become apparent to those skilled in the art can be made in this invention without departing from the spirit and scope thereof.

I claim:

1. A tetrablock copolymer having the formula $$B_h - I_h' - B_h' - I_h$$

wherein $B_h$ and $B_h'$ are hydrogenated blocks of polymerized butadiene, $I_h$ and $I_h'$ are hydrogenated blocks of polymerized alkyl substituted conjugated diene of 5 or 6 carbon atoms per molecule.

2. A polymer in accordance with claim 1 wherein less than about 10 percent of the original unsaturation of the polymerized diene blocks is present in the polymer.

3. A polymer in accordance with claim 1 wherein each of the hydrogenated blocks of polymerized butadiene $B_h$ and $B_h'$ constitute 10 to 40 weight percent of the total polymer, the block $I_h$ constitutes 5 to 30 weight percent of the total polymer and the block $I_h'$ constitutes from 20 to 60 weight percent of the total polymer.

4. A polymer in accordance with claim 1 wherein the total of the blocks $B_h$ and $B_h'$ constitute 20 to 50 weight percent of the total polymer.

5. A polymer in accordance with claim 1 wherein I and $I_h'$ are hydrogenated blocks of polymerized isoprene.

6. A polymer in accordance with claim 1 having a weight average molecular weight of about 50,000 to 750,000.

* * * * *